United States Patent
Ma et al.

(10) Patent No.: US 10,998,009 B1
(45) Date of Patent: May 4, 2021

(54) AIR TURBULENCE CONTROL FOR ACTUATORS

(71) Applicant: Seagate Technology LLC, Cupertino, CA (US)

(72) Inventors: Yichao Ma, Singapore (SG); Yimin Niu, Eden Prairie, MN (US); Xiong Liu, Singapore (SG); Lionel Young, Singapore (SG)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 16/676,091

(22) Filed: Nov. 6, 2019

(51) Int. Cl.
*G11B 33/14* (2006.01)
*G11B 25/04* (2006.01)

(52) U.S. Cl.
CPC .......... *G11B 33/148* (2013.01); *G11B 25/043* (2013.01)

(58) Field of Classification Search
None
See application file for complete search history.

(56) References Cited

U.S. PATENT DOCUMENTS

| | | | |
|---|---|---|---|
| 6,922,308 B1 | 7/2005 | Butler | |
| 7,268,972 B2 | 9/2007 | Akama et al. | |
| 7,551,402 B2 | 6/2009 | Hayakawa | |
| 7,576,945 B2 | 8/2009 | Kanada et al. | |
| 9,449,649 B1 | 9/2016 | Rejae et al. | |
| 2009/0002882 A1* | 1/2009 | Yoshikawa | G11B 33/1446 360/97.18 |
| 2009/0168234 A1* | 7/2009 | Miyazaki | G11B 5/6005 360/97.14 |
| 2010/0321821 A1* | 12/2010 | Iwase | G11B 33/1486 360/97.16 |
| 2012/0075750 A1 | 3/2012 | Chan et al. | |
| 2020/0090707 A1* | 3/2020 | Sato | G11B 33/148 |

* cited by examiner

*Primary Examiner* — Allen T Cao
(74) *Attorney, Agent, or Firm* — Faegre Drinker Biddle & Reath LLP

(57) ABSTRACT

A hard disk drive includes a base deck and a load/unload ramp component. The base deck includes a floor and sidewalls. The load/unload ramp component is coupled to the floor of the base deck. At least one of the sidewalls includes an arcuate extension portion that extends to contact the load/unload ramp component.

20 Claims, 6 Drawing Sheets

AIR TURBULENCE CONTROL FOR ACTUATORS

SUMMARY

In certain embodiments, a hard disk drive includes a base deck and a load/unload ramp component. The base deck includes a floor and sidewalls. The load/unload ramp component is coupled to the floor of the base deck, and at least one of the sidewalls includes an arcuate extension portion that extends to contact the load/unload ramp component.

In certain embodiments, a base deck includes a floor and sidewalls. The floor includes an arcuate slope portion that extends between a lower section of the floor and an upper section of the floor. The sidewalls extend around a periphery of the floor, and at least one of the sidewalls includes an extension that extends from the at least one sidewall. The arcuate slope portion transitions from the lower section to the upper section along the extension.

In certain embodiments, a method for making a base deck is disclosed. The method includes forming a floor with an arcuate slope portion that extends between a lower section of the floor and an upper section of the floor, forming sidewalls extending around a periphery of the floor, and forming an extension portion that extends from one of the sidewalls away from the periphery of the floor. The arcuate slope portion transitions from the lower section to the upper section along the extension.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
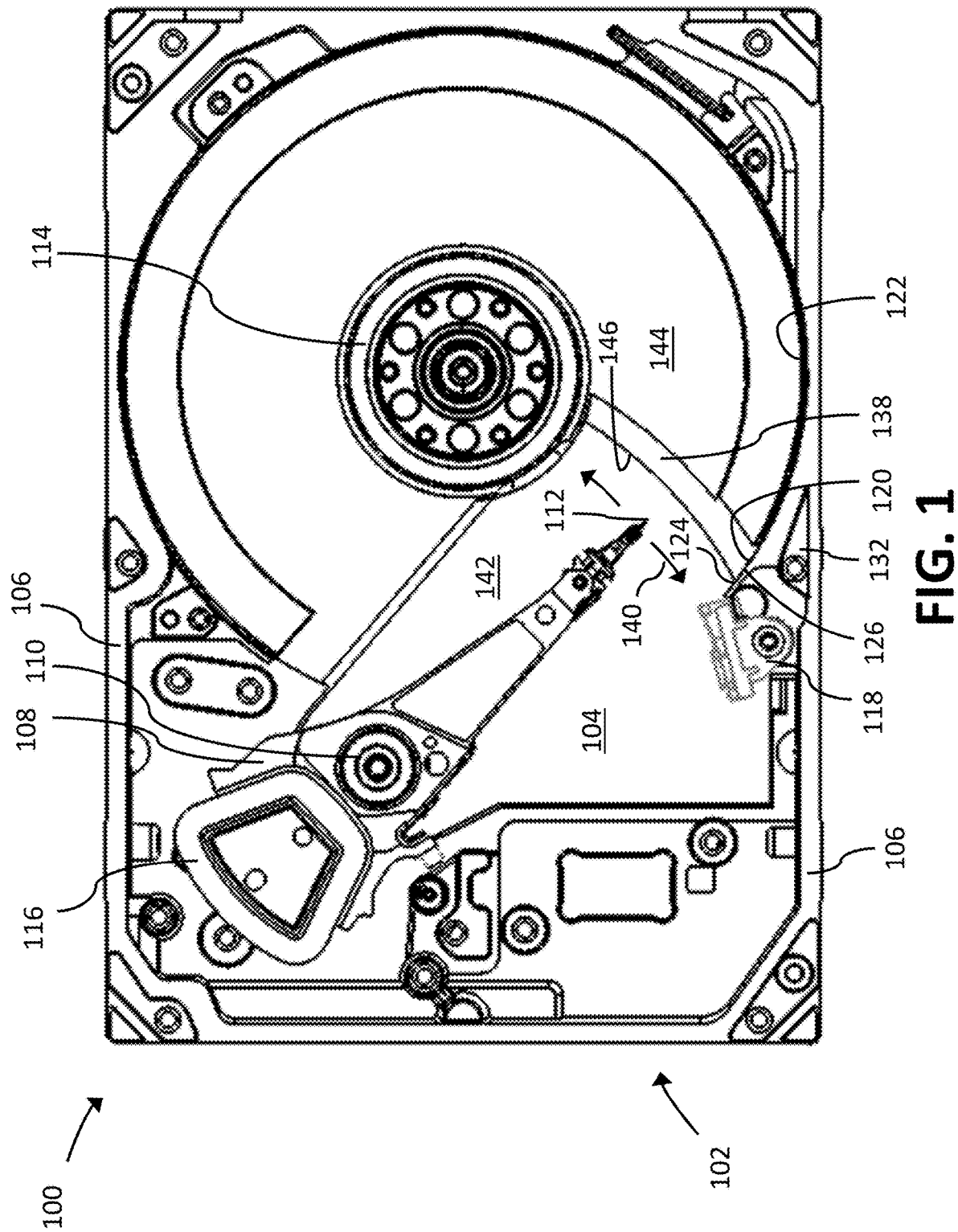
FIG. 1 shows a top view of portions of a hard disk drive, in accordance with certain embodiments of the present disclosure.

While the disclosure is amenable to various modifications and alternative forms, specific embodiments have been shown by way of example in the drawings and are described in detail below. The intention, however, is not to limit the disclosure to the particular embodiments described but instead is intended to cover all modifications, equivalents, and alternatives falling within the scope the appended claims.

DETAILED DESCRIPTION

When hard disk drives operate, air circulates within the internal cavities of the hard disk drives. Left uncontrolled, this circulating air can negatively affect stability and performance of components of the hard disk drives. For example, turbulent air can cause rotating magnetic recording media to vibrate or "flutter" and/or sliders to be knocked off track and out of position. These events can cause errors (e.g., track misregistration errors) when writing data to or reading data from the rotating magnetic recording media. The risk and effect of error increases as areal density continues to increase in hard disk drives. Certain embodiments of the present disclosure are accordingly directed to controlling air flow within hard disk drives.

FIG. 1 shows a hard disk drive 100 including a base deck 102. The base deck 102 includes a base member or a floor 104 with sidewalls 106 that form an internal cavity in which various hard disk drive components are positioned. As shown in FIG. 1, the sidewalls 106 extend around a periphery of the floor 104. When the hard disk drive 100 is assembled, a cover 107 (shown in FIG. 3) is coupled to the base deck 102 to enclose the hard disk drive components within the internal cavity.

FIG. 1 shows the hard disk drive 100 with an actuator assembly 108, which can rotate around a pivot bearing 110. The actuator assembly 108 positions read/write heads 112 over data tracks on rotating magnetic recording media (not shown). During operation, a spindle motor 114 rotates the magnetic recording media while the actuator assembly 108 is driven by a voice coil motor assembly (a coil portion 116 of which is shown in FIG. 1) to pivot around the pivot bearing 110. The read/write heads 112 write data to the magnetic recording media by generating and emitting a magnetic field towards the magnetic recording media which induces magnetically polarized transitions on the desired data track on the magnetic recording media. The magnetically polarized transitions are representative of the data. The read/write heads sense (or "read") the magnetically polarized transitions with a magnetic transducer. As the magnetic recording media rotates adjacent the read/write heads 112, the magnetically polarized transitions induce a varying magnetic field into a magnetic transducer of the read/write heads 112. The magnetic transducer converts the varying magnetic field into a read signal that is delivered to a preamplifier and then to a read channel for processing to be used by a host system (e.g., server, laptop computer, desktop computer).

When the read/write heads 112 are not positioned over the magnetic recording media, lift tabs at the distal ends of the actuator assembly 108 can rest on a load/unload ramp component 118. The load/unload ramp component 118 is coupled to the floor 104 of the base deck 102 by a fastener. The load/unload ramp component 118 includes ramp-like surfaces on which the lift tabs of the actuator assembly 108 slide on when being loaded onto or unloaded from the load/unload ramp component 118.

Figure 2:
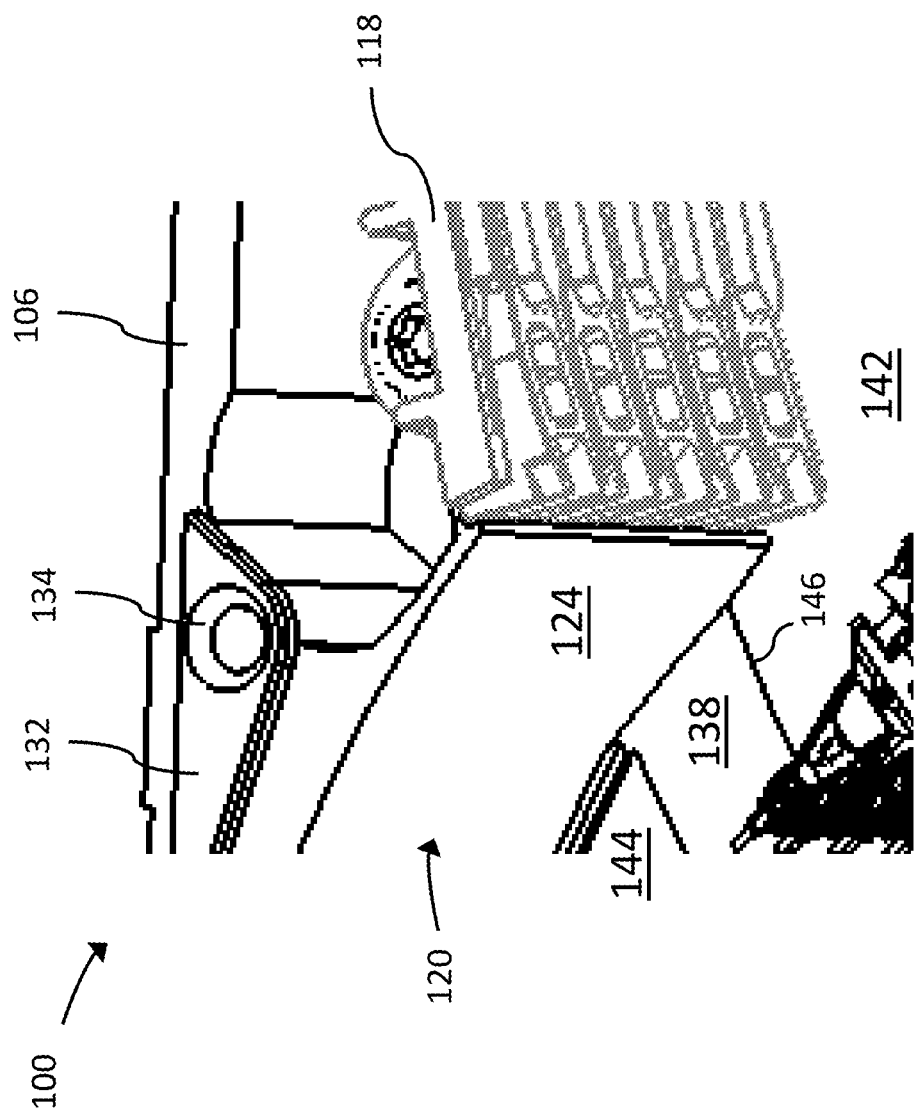
FIG. 2 shows a perspective view of portions of the hard disk drive of FIG. 1, in accordance with certain embodiments of the present disclosure.
Figure 3:
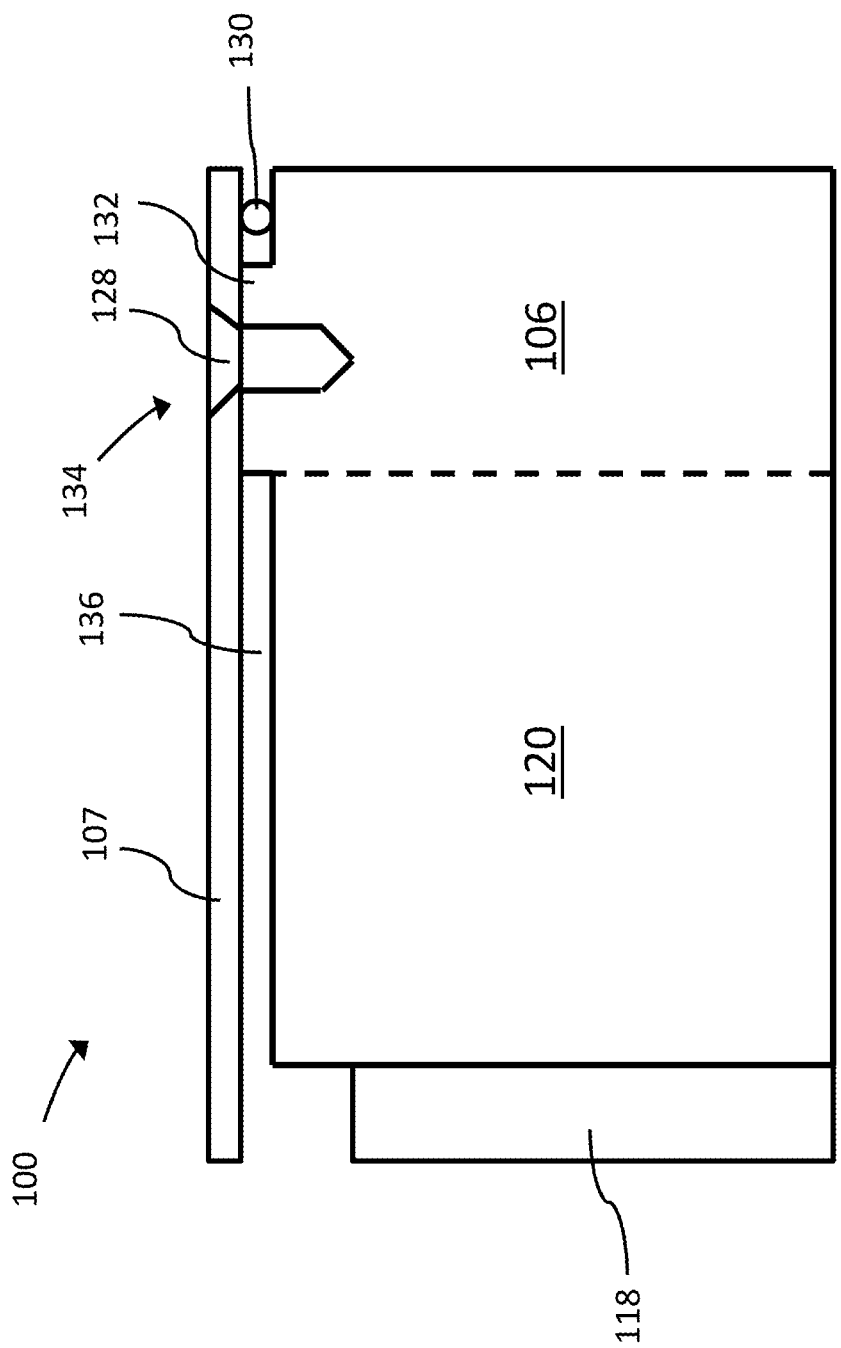
FIG. 3 shows a cut-away, side view of portions of the hard disk drive of FIG. 1, in accordance with certain embodiments of the present disclosure.

As mentioned above, during operation of the hard disk drive 100, air circulates throughout the internal cavity and around the components of the hard disk drive 100. This air can affect the ability of the hard disk drive 100 to accurately write and read data. FIGS. 1-3 show various features that help reduce the amount of air turbulence created or existing at vulnerable parts of the hard disk drive 100 while FIGS. 4 and 5 show an alternative design of a hard disk drive 200 that does not include the air-turbulence-reducing features shown in FIGS. 1-3.

FIGS. 1 and 2 show the sidewall 106 closest to the load/unload ramp component 118 including an extension portion 120. In certain embodiments, the extension portion 120 is arcuate-shaped such that the extension portion 120 extends the shape of the sidewall 106. For example, the sidewall 106 shown in FIG. 1 includes a wall surface 122 that is arcuate-shaped such that a distance between the wall surface 122 and the disk-shaped magnetic recording media remains substantially the same. This type of wall surface 122 can help maintain stability of the magnetic recording media and is sometimes referred to as a shroud. As such, in embodiments where the extension portion 120 extends the shape of the sidewall 106, the extension portion 120 can include an arcuate surface 124.

The extension portion 120 shown in FIGS. 1 and 2 extends from the sidewall 106 towards the load/unload ramp component 118. In certain embodiments, the extension portion 120 directly contacts (e.g., at a distal end of the extension portion 120) the load/unload ramp component 118 such that there is no gap between the load/unload ramp component 118 and the extension portion 120. As such, the extension portion 120 blocks air that would otherwise pass between the sidewall 106 and the load/unload ramp component 118.

Figure 4:
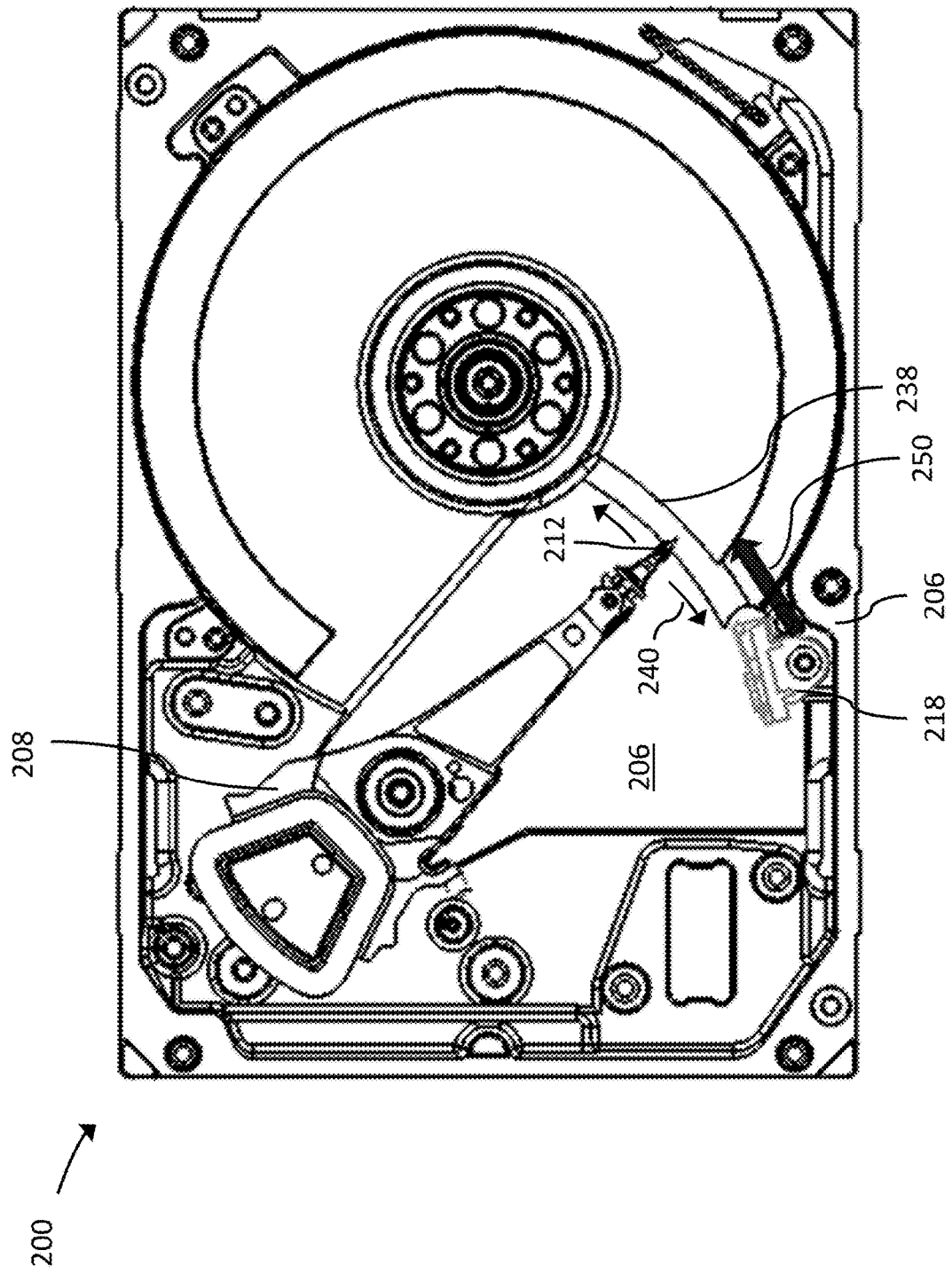
FIG. 4 shows a top view of an alternative design of a hard disk drive.
Figure 5:
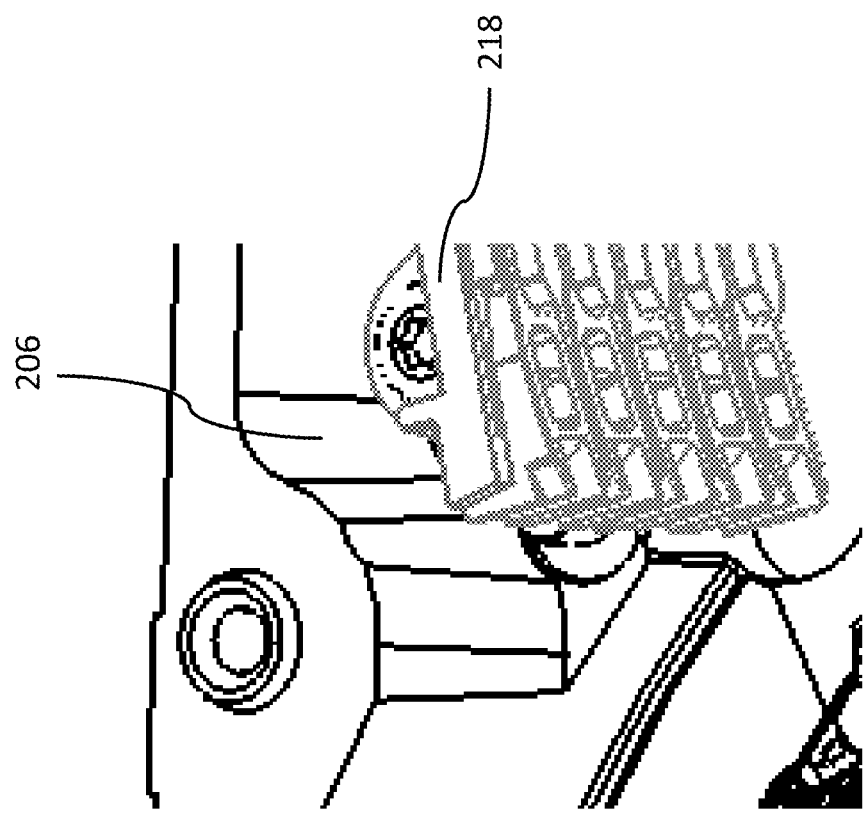
FIG. 5 shows a perspective view of portions of the alternative design of the hard disk drive of FIG. 4.

In contrast to the hard disk drive 100 of FIG. 1, the hard disk drive 200 shown in FIGS. 4 and 5 lacks a feature like the extension portion 120 and therefore allows air to pass between a sidewall 206 and a load/unload ramp component 218, as indicated by the arrow 250 shown in FIG. 4. This air can create turbulence that affects the stability of the read/write heads 112 and the magnetic recording media. However, for the hard disk drive 100 of FIGS. 1-3, air that enters the area between the sidewall 106 and the load/unload ramp component 118 is blocked by the extension portion 120. Put another away, the extension portion 120 helps trap turbulent air behind the load/unload ramp component 118 to reduce the negative effects of turbulent air on the read/write heads 112 and the magnetic recording media. Further, the extension portion 120 provides an extension of the shroud sidewall 106. Therefore, the extension portion 120 shown in FIGS. 1-3 can help mitigate the negative effect of air on the stability of the read/write heads 112 and the magnetic recording media and overall performance of the hard disk drive 100.

In certain embodiments, as shown in FIGS. 1 and 2, the extension portion 120 is thinner than a thickness of the sidewalls. In certain embodiments, the extension portion 120 includes a second arcuate surface 126 that is opposite the arcuate surface 124. This second arcuate surface 126 may help guide air into and out of the space created by the sidewall 106, the extension portion 120, and the load/unload ramp component 118.

FIG. 3 shows a cut-away view of a portion of the hard disk drive 100 with the cover 107 coupled to the base deck 102 via a fastener 128. A gasket 130 is positioned between the cover 107 and the sidewall 106 to seal the hard disk drive 100 and prevent contaminants from entering the internal cavity of the hard disk drive 100. The sidewall 106 includes a raised portion 132 (also shown in FIGS. 1 and 2), which includes a hole 134 that is shaped to receive the fastener 128. With the cover 107 directly contacting the raised portion 132, there is a small gap 136 between the cover 107 and the extension portion 120 that may permit some air to pass through the gap 136. In certain embodiments, the gap 136 ranges 0.025-0.075 inches. In certain embodiments, the extension portion 120 has a height (measured from the floor 104 of the base deck 102) that is at least as tall as the height of the load/unload ramp component 118.

Additionally or alternatively, the hard disk drive 100 can include an air-turbulence-reducing feature in the form of a slope portion 138 that is positioned a farther-than-typical distance away from the travel path (represented by arrows and reference number 140) of the read/write heads 112. FIGS. 1 and 2 show the floor 104 of the base deck 102 including a lower section 142 and an upper section 144 with the slope portion 138 extending between the lower section 142 and the upper section 144 as the floor 104 transitions between the two sections. For example, as best seen in FIG. 2, the slope portion 138 starts at an initial transition line 146 (adjacent the extension portion 120) and begins to slope upward until reaching a height of the upper section 144 of the floor 104. This transition from the lower section 142 and the upper section 144 occurs along the extension portion 120 as shown in FIG. 2.

The slope portion 138 also extends lengthwise between the extension portion 120 and the spindle motor 114. As the slope portion 138 extends between the extension portion 120 and the spindle motor 114, the shape of the slope portion 138 curves (e.g., is arcuate-shaped) such that it is substantially similar to the travel path 140 of the distal end of the actuator assembly 108 near where the read/write heads 112 are positioned.

The lower section 142 of the floor 104 allows the hard disk drive 100 to include more space between the floor 104 and the cover 107. As such, more arms of the actuator assembly 108 (and therefore more read/write heads 112) can fit into the hard disk drive 100. However, to create the lower section 142 of the floor 104, the base deck 102 needs to be thinner at the lower section 142 compared to the thickness of the base deck 102 at the upper section 144. Reducing the thickness of the base deck 102 results in the base deck 102 being less rigid and therefore more susceptible to deformation and vibration. As a result, the slope portion 138 is typically positioned such that the lower section 142 allows for additional read/write heads 112 to be positioned in the hard disk drive 100 but consumes the least amount of area of the base deck 102 so that the rigidity of the base deck 102 is not compromised. For example, as shown in FIGS. 4 and 5, the slope portion 238 of the hard disk drive 200 is positioned such that a portion of the actuator assembly 208, where the read/write heads 212 are positioned passes over the slope portion 238 during operation. Put another way, the travel path (represented by arrows and reference number 240) of the read/write heads 212 is along and over the slope portion 238. This arrangement increases the space between the floor 204 and the cover (not shown in FIGS. 4 and 5) for additional read/write heads 212, but minimizes the area consumed by a thinner portion of the base deck 102.

However, as air passes along the slope portion 238, the air can become turbulent. This turbulence can affect positioning of the read/write heads 212. The effect is most problematic for the read/write head 212 positioned closest to the floor 204, but the turbulence will affect positioning of other read/write heads 212 on the actuator assembly 208. The closer the slope portion 238 is positioned to the distal end of the actuator assembly 208, the more likely turbulent air will affect the read/write heads 212.

As such, the slope portion 138 of the hard disk drive 100 of FIGS. 1-3 is positioned away from the travel path 140 of the distal end of the actuator assembly 108. In certain embodiments, the initial transition line 146 of the slope portion 138 is positioned 0.50-0.75 inches from the travel path 140 of the distal end of the actuator assembly 108. Positioning the slope portion 138 further away from the read/write heads 112 reduces the effects of turbulent air on the read/write heads 112 created by the slope portion 138. This reduction of turbulent air is particularly effective for the read/write head 112 positioned closest to the floor 104 of the base deck 102. Further, it has been found that the increase in the thinner area of the base deck 102 has a negligible effect on the overall reduction in stiffness of the base deck 102.

As described above, FIGS. 1-3 show various features that help reduce the amount of air turbulence created or existing at vulnerable parts of the hard disk drive 100. In certain embodiments, the extension portion 120 helps to block turbulent air that would otherwise pass between the sidewall 106 and the load/unload ramp component 118 towards the read/write heads 112 and the magnetic recording media. Additionally or alternatively, the hard disk drive 100 can include an air-turbulence-reducing feature in the form of a slope portion 138 that is positioned a farther-than-typical distance away from the travel path 140 of the read/write heads 112. Therefore, the various features shown in FIGS. 1-3 and described above can help mitigate the negative effect of air on the stability of the read/write heads 112 and the magnetic recording media and overall performance of the hard disk drive 100.

Figure 6:
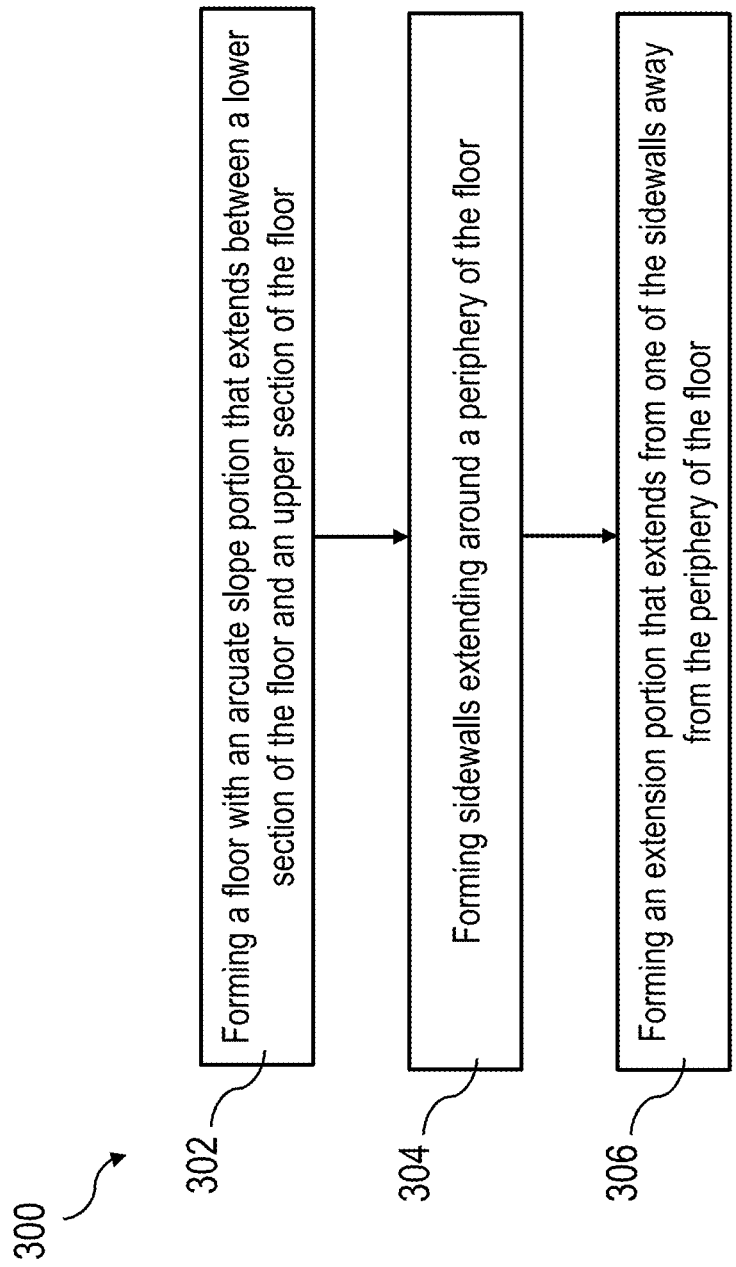
FIG. 6 shows a block diagram of a method for making a hard disk drive, in accordance with certain embodiments of the present disclosure.

FIG. 6 shows a block representation of steps of a method 300 for making the base deck 102. The method 300 includes forming the floor 104 of the base deck 102 with the slope portion 138 that extends between the lower section of the floor 104 and the upper section of the floor 104 (block 302 in FIG. 6). The method 300 further includes forming the sidewalls 106 extending around a periphery of the floor 104 (block 304 in FIG. 6). The method 300 further includes forming the extension portion 120 that extends from one of the sidewalls 106 away from the periphery of the floor 104 (block 306 in FIG. 6). As shown in FIG. 2, the slope portion 138 transitions from the lower section to the upper section along the extension.

In certain embodiments, the forming steps of the method 300 can include machining, casting, and/or forging. For example, the base deck 102 can be made by first making a casting or forging of the base deck 102 with the floor 104 and the sidewalls 106. Next, various features of the base deck 102 (e.g., the extension portion 120, the slope portion 138) can be machined by a material-removal process. After the features of the base deck 102 are created, components of the hard disk drive 100 (e.g., the actuator assembly 108, the spindle motor 114, and the like) can be assembled to the base deck 102. Finally, the cover 107 can be attached to the base deck 102 to enclose the components.

Various modifications and additions can be made to the embodiments disclosed without departing from the scope of this disclosure. For example, while the embodiments described above refer to particular features, the scope of this disclosure also includes embodiments having different combinations of features and embodiments that do not include all of the described features. Accordingly, the scope of the present disclosure is intended to include all such alternatives, modifications, and variations as falling within the scope of the claims, together with all equivalents thereof.

We claim:

1. A hard disk drive comprising:
a base deck including a floor and sidewalls; and
a load/unload ramp component coupled to the floor of the base deck,
at least one of the sidewalls including an arcuate extension portion extending to contact the load/unload ramp component.

2. The hard disk drive of claim 1, wherein the arcuate extension portion extends to contact the load/unload ramp component such that there is no gap between the arcuate extension portion and the load/unload ramp component.

3. The hard disk drive of claim 1, wherein a distal end of the arcuate extension portion contacts the load/unload ramp component.

4. The hard disk drive of claim 1, wherein the arcuate extension portion blocks air from passing between the at least one of the sidewalls and the load/unload ramp component.

5. The hard disk drive of claim 1, wherein the arcuate extension portion includes a first arcuate surface and a second arcuate surface opposite the first arcuate surface.

6. The hard disk drive of claim 1, wherein the arcuate extension portion is thinner than a thickness of the sidewalls.

7. The hard disk drive of claim 1, wherein the floor includes an arcuate slope portion that extends between a lower section of the floor and an upper section of the floor.

8. The hard disk drive of claim 7, wherein an initial transition line of the arcuate slope portion is 0.50-0.75 inches from a travel path of a distal end of an actuator assembly.

9. The hard disk drive of claim 8, wherein the initial transition line is shaped substantially similar to the travel path.

10. The hard disk drive of claim 7, wherein the arcuate slope portion extends from the lower section to the upper section along the arcuate extension portion.

11. The hard disk drive of claim 1, wherein the arcuate slope portion extends between a spindle motor and the arcuate extension portion.

12. The hard disk drive of claim 1, further comprising:
a cover coupled to the base deck such that a gap exists between a top of the arcuate extension portion and the cover.

13. The hard disk drive of claim 12, wherein the gap ranges from 0.025-0.075 inches.

14. A base deck comprising:
a floor including an arcuate slope portion that extends between a lower section of the floor and an upper section of the floor; and
sidewalls extending around a periphery of the floor, at least one of the sidewalls including an extension that extends from the at least one sidewall, wherein the arcuate slope portion transitions from the lower section to the upper section along the extension.

15. The base deck of claim 14, wherein the extension is thinner than a thickness of the sidewalls.

16. The base deck of claim 14, wherein the arcuate slope portion begins at an initial transition line adjacent the extension.

17. The base deck of claim 14, wherein the arcuate slope portion extends between a spindle motor portion and the extension.

18. A base deck comprising:
a floor including an arcuate slope portion that extends between a lower section of the floor and an upper section of the floor;
sidewalls extending around a periphery of the floor, at least one of the sidewalls including an extension that extends from the at least one sidewall, wherein the arcuate slope portion transitions from the lower section to the upper section along the extension; and
a load/unload ramp component coupled to the floor.

19. The base deck of claim 18, wherein the extension is thinner than a thickness of the sidewalls.

20. The base deck of claim 18, wherein the arcuate slope portion begins at an initial transition line adjacent the extension.

* * * * *